US00RE46638E

(19) United States
(12) Reissued Patent
Eakin

(10) Patent Number: US RE46,638 E
(45) Date of Reissued Patent: Dec. 19, 2017

(54) CATTLE FOOT-BATH SYSTEM

(76) Inventor: John W. Eakin, Selah, WA (US)

(21) Appl. No.: 13/385,815

(22) Filed: Mar. 6, 2012

Related U.S. Patent Documents

Reissue of:
(64) Patent No.: 7,987,820
Issued: Aug. 2, 2011
Appl. No.: 12/313,601
Filed: Nov. 21, 2008

(51) Int. Cl.
*A01K 29/00* (2006.01)
*A01K 13/00* (2006.01)

(52) U.S. Cl.
CPC ..... *A01K 13/003* (2013.01)

(58) Field of Classification Search
CPC ..... A01K 13/003
USPC ..... 119/673, 666, 671; 601/158, 160, 166, 601/167; 4/492, 541.4, 541.6, 567, 572.1, 4/586, 625, 622, 671, 672
See application file for complete search history.

(56) References Cited

U.S. PATENT DOCUMENTS

| | | | |
|---|---|---|---|
| 853,533 | A | 5/1907 | Byrd |
| 983,820 | A | 2/1911 | Goff |
| 1,600,306 | A | 9/1926 | Beddoes et al. |
| 2,870,478 | A | 1/1959 | Schuster |
| 2,956,565 | A | 10/1960 | Anderson |
| 3,208,434 | A | 11/1965 | Barton |
| 4,020,796 | A | 5/1977 | Grifa |
| 4,086,669 | A | 5/1978 | Combis |
| 4,126,104 | A | 11/1978 | Overby |
| 4,317,431 | A | 3/1982 | Sparkes |
| 4,629,087 | A | 12/1986 | Lenz |
| 4,899,789 | A | 2/1990 | Carow |
| 5,058,780 | A | 10/1991 | Plester et al. |
| 5,091,343 | A | 2/1992 | Schneider et al. |
| 5,118,004 | A | 6/1992 | Carilli |

(Continued)

FOREIGN PATENT DOCUMENTS

| | | | |
|---|---|---|---|
| CN | 1726898 | A | 2/2006 |
| EP | 1099373 | A1 | 5/2001 |

(Continued)

OTHER PUBLICATIONS

Complaint against Specialty Sales LLC. filed by Eakin Enterprises, Inc. (with Attachments: # 1 pp. 9-18, # 2 Civil Cover Sheet) [Transferred from waed on Dec. 5, 2011.] (Entered: Sep. 23, 2011).

(Continued)

*Primary Examiner* — Kristen C Hayes
(74) *Attorney, Agent, or Firm* — Seed IP Law Group LLP

(57) ABSTRACT

A cattle foot-bath system, specifically adapted to mix and charge foot-bath troughs with repeatably precise quantities of chemical treatments. The system administers a concentrated medicinal agent, such as a bactericide, a fungicide, or a viruscide, for the treatment of cattle feet, and includes a day-tank feed valve, which may be a three-way or interlocked valve, for controlling an infeed flow of the concentrated medicinal agent fed into a day tank, which may be mounted to a portable tote-tank containing the concentrated medicinal agent. A day-tank drain valve controls an outlet flow of the concentrated medicinal agent drained from the day-tank, and the day-tank holds a set quantity of the concentrated medicinal agent. A footbath then receives a quantity of dilution water and the set quantity of the concentrated medicinal agent from the day-tank.

6 Claims, 5 Drawing Sheets

(56) References Cited

U.S. PATENT DOCUMENTS

| | | | | |
|---|---|---|---|---|
| 5,203,366 | A | 4/1993 | Cxeck et al. | |
| 5,248,070 | A | 9/1993 | Nolte et al. | |
| 5,259,527 | A | 10/1993 | Gates | |
| 5,381,923 | A | 1/1995 | O'Dea | |
| 5,630,379 | A | 5/1997 | Gerk et al. | |
| 5,678,591 | A | 10/1997 | Merrifield et al. | |
| 5,769,109 | A | 6/1998 | Stanton et al. | |
| 5,774,909 | A | 7/1998 | Stable | |
| 5,967,202 | A | 10/1999 | Mullen et al. | |
| 6,033,469 | A | 3/2000 | Teichert et al. | |
| 6,382,136 | B1 | 5/2002 | Bragulla et al. | |
| 6,520,118 | B2 | 2/2003 | Swiegers et al. | |
| 6,739,286 | B2 * | 5/2004 | Vander Veen | 119/673 |
| 6,742,550 | B2 | 6/2004 | Caparros | |
| 6,745,704 | B2 | 6/2004 | Carter et al. | |
| 6,948,510 | B2 | 9/2005 | King | |
| D610,264 | S | 2/2010 | Hess et al. | |
| 7,661,393 | B2 | 2/2010 | Torgerson et al. | |
| 7,770,760 | B2 | 8/2010 | McGuffey et al. | |
| 7,798,104 | B2 * | 9/2010 | Rajkondawar et al. | 119/651 |
| 7,841,299 | B2 | 11/2010 | Gerk et al. | |
| 7,980,425 | B2 | 7/2011 | Brown et al. | |
| 8,095,997 | B2 | 1/2012 | Harris | |
| 8,172,079 | B2 | 5/2012 | Greenberg et al. | |
| 2007/0074672 | A1 | 4/2007 | Torgerson et al. | |
| 2008/0105581 | A1 | 5/2008 | Kondo et al. | |
| 2008/0121189 | A1 | 5/2008 | Greeson | |
| 2008/0196674 | A1 * | 8/2008 | Buck et al. | 119/673 |
| 2008/0216762 | A1 * | 9/2008 | Gerk et al. | 119/673 |
| 2009/0027995 | A1 | 1/2009 | Bachman et al. | |
| 2009/0107414 | A1 | 4/2009 | Vecchia | |
| 2011/0100869 | A1 | 5/2011 | Spann et al. | |

FOREIGN PATENT DOCUMENTS

| | | | |
|---|---|---|---|
| EP | 1238581 | A2 | 11/2002 |
| EP | 1238581 | A3 | 11/2002 |
| FR | 2609361 | A1 | 7/1988 |
| FR | 2841142 | A1 | 12/2003 |
| GB | 1222078 | A | 2/1971 |
| GB | 1506434 | A | 4/1978 |
| GB | 1551144 | A | 8/1979 |
| GB | 1595893 | A | 8/1981 |
| GB | 2311202 | A | 9/1997 |
| JP | 2005162290 | | 6/2005 |
| NL | 1009895 | C1 | 2/2000 |
| WO | 1993001763 | | 4/1993 |
| WO | 2004033761 | A | 4/2004 |
| WO | 2007058481 | A1 | 5/2007 |
| WO | 2010069328 | A1 | 6/2010 |

OTHER PUBLICATIONS

Rule 7.1 Corporate Disclosure Statement by Eakin Enterprises, Inc. (Stratton, Rex) [Transferred from waed on Dec. 5, 2011.] (Entered: Sep. 27, 2011).

Affidavit of Service for Summons and Complaint served on Greg Peterson, Registered Agent for Specialty Sales, LLC, filed by Eakin Enterprises, Inc. (Stratton, Rex) [Transferred from waed on Dec. 5, 2011.] (Entered: Nov. 4, 2011).

Motion to Dismiss for Lack of Jurisdiction or Transfer by Specialty Sales, LLC. (Attachments: # 1 Text of Proposed Order PO Granting Motion to Dismiss or Transfer)(Cannon, Eron) [Transferred from waed on Dec. 5, 2011.] (Entered: Nov. 10, 2011).

Notice of Hearing on Motion Oral Argument Requested re 5 Motion to Dismiss for Lack of Jurisdiction or Transfer : Motion Hearing set for Feb. 1, 2012 10:00 AM in Richland before Judge Edward F. Shea (Cannon, Eron) [Transferred from waed on Dec. 5, 2011.] (Entered: Nov. 10, 2011).

Memorandum of Points and Authorities in Support re 5 Motion to Dismiss for Lack of Jurisdiction or Transfer filed by Specialty Sales LLC. (Attachments: # 1 Exhibit 1 p. 25-27, # 2 Supplement *Milgard Mfg.* v. *Illinois Union* p. 28-34)(Cannon, Eron) [Transferred from waed on Dec. 5, 2011.] (Entered: Nov. 10, 2011).

Declaration by Greg Petersen in Support re 5 Motion to Dismiss for Lack of Jurisdiction or Transfer filed by Specialty Sales LLC. (Cannon, Eron) [Transferred from waed on Dec. 5, 2011.] (Entered: Nov. 10, 2011).

Motion to Appear Pro Hac Vice Admission re Attorney: Mark D. Miller. by Specialty Sales, LLC. (Attachments: # 1 Text of Proposed Order Order Granting Pro Hac Vice Admission for Mark D. Miller)(Cannon, Eron) [Transferred from waed on Dec. 5, 2011.] (Entered: Nov. 11, 2011).

Declaration by Eron Cannon in Support re 9 Motion to Appear Pro Hac Vice Admission re Attorney: Mark D. Miller. . filed by Specialty Sales, LLC. (Cannon, Eron) [Transferred from waed on Dec. 5, 2011.] (Entered: Nov. 11, 2011).

Declaration by Mark D. Miller in Support re 9 Motion to Appear Pro Hac Vice Admission re Attorney: Mark D. Miller filed by Specialty Sales, LLC. (Cannon, Eron) [Transferred from waed on Dec. 5, 2011.] (Entered: Nov. 11, 2011).

Motion to Appear Pro Hac Vice Admission re Attorney: Marcus N. DiBuduo by Specialty Sales, LLC. (Attachments: # 1 Text of Proposed Order Granting Pro Hac Vice Admission for Marcus N. DiBuduo)(Cannon, Eron) [Transferred from waed on Dec. 5, 2011.] (Entered: Nov. 11, 2011).

Declaration by Eron Cannon in Support re 12 Motion to Appear Pro Hac Vice Admission re Attorney: Marcus N. DiBuduo filed by Specialty Sales, LLC. (Cannon, Eron) [Transferred from waed on Dec. 5, 2011.] (Entered: Nov. 11, 2011).

Declaration by Marcus N. DiBuduo in Support re 12 Motion to Appear Pro Hac Vice Admission re Attorney: Marcus N. DiBuduo, filed by Specialty Sales, LLC. (Cannon, Eron) [Transferred from waed on Dec. 5, 2011.] (Entered: Nov. 11, 2011).

Stipulation and Order to Change Venue and Dismissal of Plaintiff's Claims of Violation of the Washington Consumer Protection Act by All Parties. (Stratton, Rex) [Transferred from waed on Dec. 5, 2011.] (Entered: Dec. 1, 2011).

Order Dismissing Plaintiff's Washington Consumer Protection Act Claims, Transferring to the Eastern District of California, and Closing File. Case transferred to Eastern District of California, Fresno. Signed by Judge Edward F. Shea. (CS, Case Administrator) [Transferred from waed on Dec. 5, 2011.] (Entered: Dec. 2, 2011).

Patent New Case Documents Issued as to Patent #1:* U.S. Pat No. 7,987,820 * Aug. 2, 2011 * John W. Eakin; Complaint and Patent Report emailed to U.S. Office of Patents and Trademarks. Initial Scheduling Conference set for Apr. 10, 2012 at 09:30 AM in Courtroom 7 (SKO) before Magistrate Judge Sheila K. Oberto. (Attachments: # 1 Standing Order, # 2 Consent Form, # 3 Patent Report, # 4 VDRP Form) (Robles, S) (Entered: Dec. 5, 2011).

Substitution of Attorney—Proposed, submitted by Specialty Sales, LLC. (DiBuduo, Marcus) (Entered: Dec. 9, 2011).

Pro Hac Vice Application and Proposed Order submitted by Eakin Enterprises, Inc. for attorney Rex B. Stratton to appear Pro Hac Vice. Attorney Lee, David C added. (Lee, David) (Entered: Dec. 14, 2011).

Pro Hac Vice Order: Added Rex B. Stratton for Plaintiff, Eakin Enterprises Inc., signed by Magistrate Judge Shela K. Oberto on Dec. 15, 2011. (Hellings, J) (Entered: Dec. 16, 2011).

Order Substituting Attorney. Added attorneys Mark D. Miller and Marcus N. DiBuduo for Specialty Sales LLC, in place of McCormick, Barstow, Sheppard, Wayte &Carruth LLP, signed by Magistrate Judge Shela K. Oberto on Dec. 15, 2011. (Hellings, J) (Entered: Dec. 16, 2011).

Pro Hac Vice Application and Proposed Order submitted by Eakin Enterprises, Inc. for attorney Chris E. Svendsen to appear Pro Hac Vice. (Lee, David) (Entered: Dec. 16, 2011).

Association of Attorney: (Lee, David) (Entered: Dec. 16, 2011).

Stipulation for an Extension of Time for Defendant to Respond to Complaint by Specialty Sales, LLC. (Miller, Mark) (Entered: Dec. 16, 2011).

Pro Hac Vice Order signed by Magistrate Judge Shela K. Oberto on Dec. 16, 2011. Attorney Chris E. Svendsen, PHV appearing for Plaintiff Eakin Enterprises Inc. (Verduzco, M) (Entered: Dec. 19, 2011).

(56) References Cited

OTHER PUBLICATIONS

Answer to 1 Complaint with Jury Demand, Crossclaim against John W. Eakin, Counterclaim against Eakin Enterprises Inc by Specialty Sales, LLC. (Miller, Mark) (Entered: Jan. 6, 2012).
Statement of Pursuant to Rule 7.1 by Cross Claimant Specialty Sales LLC, Defendant Specialty Sales LLC, Counter Claimant Specialty Sales, LLC. (Miller, Mark) (Entered: Jan. 6, 2012).
Answer to Counterclaim by John W. Eakin, Eakin Enterprises, Inc. Attorney Lee, David C added.(Lee, David) (Entered: Jan. 27, 2012).
Bulk Bins, Storage and savings in bulk, Nylex Rotomould; Aug. 22, 2006.
Buyer's Guide: Intermediate Bulk Containers and Bins; Snyder Industries, Inc Mar. 8, 2007.
Nylex Bulkibox, Supertanks; RJ Cox Engineering Dec. 31, 2009.
Milk, How Products Are Made, vol. 4,. Advameg, Inc.; Advameg, Inc. May 17, 2012.
Day Tank Definition, HU MIMI; May 17, 2012.
Assmann Polyethylene Tanks Brochure; Assmann Corporation of America Oct. 28, 2005.
Force Flow Site Map; Force Flow Chemical Monitoring Systems May 17, 2012.
Our PIG Poly Containment Units, The Big Pigalog, 2012 Buying Guide; New Pig Corporation May 18, 2012.
Justrite Master Catalog 2003-2004, Safety and Storage Solutions; Justrite Manufacturing Company Oct. 3, 2003.
PIG Poly IBC Containment Unit, Matthews An Authorized New Pig Distributor, Catalog; Matthews Austalasia Ltd. Apr. 7, 2005.
IBS Containment & Dispensing Station, Little Giant, (online archive); Brennan Equipment andManufacturing Company Dec. 16, 2004.
Little Giant Catalog, Industrial Floor Trucks and Carts, Brennan Equipment and Manufacturing Company, 2004; Brennan Equipment and Manufacturing Company Jun. 10, 2004.
Poly IBC Containment Unit (p. 367), The Big Pigalog, 2005 Buying Guide; New Pig Corporation Dec. 31, 2005.
Containment Unit for IBC tanks (p. 377), The Big Pigalog, 2007 Buying Guide ; New Pig Corporation Dec. 31, 2007.
Containment Unit for IBC tanks (p. 69), Pig Facility Saver, Sep. 2002; New Pig Corporation Sep. 30, 2002.
Containment Unit for IBC tanks (p. 237), New Pig: Pig Leak and Spill Products, Jan. 1998 ; New Pig Corporation Jan. 31, 1998.
Double duty Caddy & Outdoor model (28663ecp); Justrite Manufacturing Company Sep. 29, 2010.
Dispensing Shelf & Open-view Sump (28667ecp); Justrite Manufacturing Company Sep. 28, 2010.
Pro Hac Vice Order signed by Magistrate Judge Sheila K. Oberto on Dec. 16, 2011. Attorney Chris E. Svendsen, PHV appearing for Plaintiff Eakin Enterprises Inc. (Verduzco, M) (Entered: Dec. 19, 2011).
Answer to 1 Complaint with Jury Demand, Crossclaim against John W. Eakin, Counterclaim against Eakin Enterprises Inc by Specialty Sales LLC.(Miller, Mark) (Entered: Jan. 6, 2012).
Statement of Pursuant to Rule 7.1 by Cross Claimant Specialty Sales LLC, Defendant Specialty Sales LLC, Counter Claimant Specialty Sales LLC. (Miller, Mark) (Entered: Jan. 6, 2012).
Answer to Counterclaim by John W. Eakin, Eakin Enterprises Inc. Attorney Lee, David C added.(Lee, David) (Entered: Jan. 27, 2012).
Decline to Proceed Before US Magistrate Judge by John W. Eakin, Eakin Enterprises Inc. Attorney Stratton, Rex Bennett added. (Stratton, Rex) (Entered: Mar. 21, 2012).
Decline to Proceed Before US Magistrate Judge by Specialty Sales LLC. (Miller, Mark) (Entered: Mar. 21, 2012).
Joint Scheduling Report by John W. Eakin, Eakin Enterprises Inc, Specialty Sales LLC. (Attachments: # 1 Exhibit Proposed First Amended Complaint, # 2 Proposed Order Proposed Order Regarding E-Discovery)(DiBuduo, Marcus) (Entered: Apr. 3, 2012).
Scheduling Order: signed by Magistrate Judge Sheila K. Oberto on Apr. 11, 2012. (Kusamura, W) (Entered: Apr. 11, 2012).
Amended Document by Eakin Enterprises Inc: Amended 1 Complaint. (Stratton, Rex) (Entered: Apr. 13, 2012).
Stipulation and Proposed Order for E-Discovery re 35 Scheduling Report by John W. Eakin, Eakin Enterprises Inc, Specialty Sales LLC. (DiBuduo, Marcus) (Entered: Apr. 13, 2012).
First Amended Complaint against Eakin Enterprises Inc by Eakin Enterprises Inc.(Stratton, Rex) (Entered: Apr. 16, 2012).
Stipulation and Order regarding e-discovery signed by Magistrate Judge Sheila K. Oberto on Apr. 16, 2012. (Timken, A) (Entered: Apr. 16, 2012).
Motion to Dismiss by Specialty Sales LLC. Motion Hearing set for Jun. 7, 2012 at 08:30 AM in Courtroom 4 (LJO) before District Judge Lawrence J. O'Neill. (Attachments: # 1 Points and Authorities in Support of Motion to Dismiss and Alternative Motion for Partial Summary Judgment, # 2 Supplement Request for Judicial Notice, # 3 Exhibit A to Request for Judicial Notice, # 4 Exhibit B to Request for Judicial Notice, # 5 Exhibit C to Request for Judicial Notice, #6 Exhibit D to Request for Judicial Notice, # 7 Statement of Undisputed Facts)(Miller, Mark) (Entered: Apr. 26, 2012).
Proposed Order re (a) Dismissal of Count I of the First Amended Complaint, and (2) Summary Judgment in Favor of Specialty Sales, LLC on Count I of the First Amended Complaint and Count II of the Counterclaim re 43 Motion to Dismiss. (Attachments: # 1 Proposed Order)(Miller, Mark) (Entered: Apr. 26, 2012).
Response by Eakin Enterprises Inc to 43 Motion to Dismiss. (Attachments: # 1 Statement of Undisputed Facts) (Stratton, Rex) (Entered: May 23, 2012).
Declaration of Chris E. Svendsen in Opposition to 43 Motion to Dismiss. (Attachments: # 1 Exhibit A) (Stratton, Rex) (Entered: May 23, 2012).
Proposed Order re Denying Motion to Dismiss re 43 Motion to Dismiss. (Stratton, Rex) (Entered: May 23, 2012).
Reply by Specialty Sales LLC re 43 Motion to Dismiss, 46 Declaration, 45 Response. (Attachments: # 1 Statement of Evidentiary Objections, # 2 Declaration of Don Alsup, # 3 Exhibit A to Alsup Declaration, # 4 Declaration of Mark D. Miller, # 5 Exhibit A to Miller Declaration, # 6 Exhibit B to Miller Declaration, # 7 Exhibit C to Miller Declaration, # 8 Exhibit D to Miller Declaration)(Miller, Mark) (Entered: May 31, 2012).
Order Supplemental Filings and Vacating Jun. 7, 2012 hearing on Motion to Dismiss, signed by District Judge Lawrence J. O'Neill on Jun. 4, 2012. (Kusamura, W) (Entered: Jun. 4, 2012).
Declaration of John W. Eakin in Opposition to 43 Motion to Dismiss. (Stratton, Rex) (Entered: Jun. 8, 2012).
Stipulation and Proposed Order for Extending Discovery and Disclosures related to Unfair Competition Claims re 37 Scheduling Order,,,, Set/Reset Deadlines and Hearings,,, by Specialty Sales LLC. (Attachments: # 1 Declaration of Rex B. Stratton in Support of Stipulation and Proposed Order)(Miller, Mark) (Entered: Jun. 13, 2012).
Stipulation and Order regarding Disclosures and Discovery related to Unfair Competition Claims, signed by Magistrate Judge Sheila K. Oberto on Jun. 13, 2012. (Kusamura, W) (Entered: Jun. 13, 2012).
Objections by Cross Claimant Specialty Sales LLC, Defendant Specialty Sales LLC, Counter Claimant Specialty Sales LLC to 50 Declaration, 43 Motion to Dismiss. (Miller, Mark) (Entered: Jun. 13, 2012).
Order re Settlement Conference signed by Magistrate Judge Sheila K. Oberto on Jun. 19, 2012. (Timken, A) (Entered: Jun. 19, 2012).
Declaration of John W. Eakin (signed) in Opposition to 43 Motion to Dismiss. (Stratton, Rex) (Entered: Jun. 20, 2012).
Response by John W. Eakin, Eakin Enterprises Inc to 53 Objections. (Stratton, Rex) (Entered: Jun. 21, 2012).
Order Denying Without Prejudice Specialty's Motion for Summary Judgment and Eakin Enterprises' Request for a Stay (Doc. 43 ), Signed by District Judge Lawrence J. O'Neill on Jun. 26, 2012. (Arellano, S.) (Entered: Jun. 26, 2012).
Motion to Compel Responses to Discovery Requests by Specialty Sales LLC. Motion Hearing set for Aug. 1, 2012 at 09:30 AM in Courtroom 7 (SKO) before Magistrate Judge Sheila K. Oberto. (Miller, Mark) (Entered: Jun. 28, 2012).
Stipulation and Proposed Order for Continuing Settlement Conference by Eakin Enterprises Inc. (Stratton, Rex) (Entered: Jul. 3, 2012).

(56) References Cited

OTHER PUBLICATIONS

First Amended Answer to 41 Amended Complaint with Jury Demand, First Amended Crossclaim against John W. Eakin, First Amended Counterclaim against Eakin Enterprises Inc by Specialty Sales LLC.(Miller, Mark) (Entered: Jul. 5, 2012).
Stipulation and Order Continuing Settlement Conference. The Settlement Conference currently set for Jul. 13, 2012, is Continued to Oct. 2, 2012, at 10:00 AM in Courtroom 7 (SKO) before Magistrate Judge Sheila K. Oberto. Order signed by Magistrate Judge Sheila K. Oberto on Jul. 11, 2012. (Timken, A) (Entered: Jul. 11, 2012).
Stipulation and Proposed Order for Confidentiality by Specialty Sales LLC. (Miller, Mark) (Entered: Jul. 13, 2012).
Eakin Enterprises and John Eakin's Answer to Counterclaim by John W.Eakin, Eakin Enterprises Inc(a Washington corporation). (Stratton, Rex) (Entered: Jul. 20, 2012).
Order on 63 Request for Stipulated Protective Order. The parties' stipulated request for a protective order (Doc. 63) is Denied without prejudice to renewing the request. Order signed by Magistrate Judge Sheila K. Oberto on Jul. 20, 2012. (Timken, A) (Entered: Jul. 20, 2012).
Stipulation and Proposed Order for Continuing Hearing on Motion to Compel Responses to Discovery Requests re 67 Minute Order, Set/Reset Deadlines and Hearings,,,,,, by Specialty Sales LLC. (DiBuduo, Marcus) (Entered: Jul. 31, 2012).
Stipulation and Order re Continuing hearing on motion to compel responses to discovery requests. The Hearing on Specialty's Motion to Compel Responses to Discovery Requests shall be continued until Aug. 29, 2012, at 9:30 A.M. in Courtroom 7, subject to withdrawal by the parties if Eakin's supplemental responses and the Declaration of John Eakin called for herein cures the present deficiencies. Order signed by Magistrate Judge Sheila K. Oberto on Aug. 1, 2012.
Stipulation and Proposed Order for Confidentiality re 65 Order, by Specialty Sales LLC. (DiBuduo, Marcus) (Entered: Aug. 1, 2012).
Stipulation and Order re Confidentiality Agreement signed by Magistrate Judge Sheila K. Oberto on Aug. 2, 2012. (Timken, A) (Entered: Aug. 2, 2012).
Withdrawal of 58 Motion to Compel Responses to Discovery Requests by Specialty Sales LLC. (DiBuduo, Marcus) (Entered: Aug. 21, 2012).
Order re Settlement Conference signed by Magistrate Judge Sheila K. Oberto on Sep. 6, 2012. (Timken, A) (Entered: Sep. 6, 2012).
Statement of Joint Claim Construction and Prehearing Statement by Cross Claimants Specialty Sales LLC, Specialty Sales LLC, Counter Claimants Specialty Sales LLC, Specialty Sales LLC, Defendant Specialty Sales LLC. (DiBuduo, Marcus) (Entered: Sep. 12, 2012).
Notice of Submission of Confidential Settlement Conference Statement by Specialty Sales LLC. (DiBuduo, Marcus) (Entered: Sep. 25, 2012).
Notice of Submission of Confidential Settlement Conference Statement by Eakin Enterprises Inc. (Stratton, Rex) (Entered: Sep. 25, 2012).
Stipulation of Dismissal Pursuant to FRCP 41 by Eakin Enterprises Inc. (Stratton, Rex) (Entered: Sep. 28, 2012).
Rule 41 Dismissal of Complaint of Eakin Enterprises, Inc., and Dismissal of Counterclaims of Specialty Sales, LLC, signed by District Judge Lawrence J. O'Neill on Sep. 28, 2012. Case Closed. (Fahrney, E) (Entered: Oct. 1, 2012).
E-mail from Alex Eakin and referenced photo, dated Oct. 13, 2005 <EAK010173-EAK010174.pdf> (2 pages).
E-mail from Kelly D. Ledgerwood and referenced 'word drawing,' dated Oct. 22, 2004 <EAK010176-EAK010178.pdf> (3 pages).
Den Hartog Industires Inc. "6 Gal. Specialty Tank" drawing, dated Jul. 26, 2001 <EAK010179.pdf> (1 page).
The Use of Potassium Permanganate in Fish Ponds, Andrew M. Lazur (Document FA23); Institute of Food and Agricultural Sciences, University of Florida May 22, 2012.
Texas Fluoridation Project, Flourosilic AcidSystem, 100 Gallon Bulk, Open Top Tank Containment Pressurized Injection Type; Texas Department of State Health Services Feb. 19, 2007.
Equipment Specification, Fluorosilicic Acid System, ES-1, Revision 13; Texas Department of State Health Services Oct. 18, 2005.
Texas Fluoridation Project, Typical Liquid Feed System, Carboy Storage; Texas Department of State Health Services Feb. 19, 2007.
Texas Fluoridation Project, Typical Liquid Feed System, Bulk Storage; Texas Department of State Health Services Feb. 19, 2007.
Fluoridation System Technical Requirements, Fluorosilic Acid System, TR-1, Revision 1 ; Texas Department of State Health Services May 9, 2005.
Drum Management System For Storage and Dispensing, Gator Drum Management System, Modules combine efficient drum storage, positive spill control, and safe liquid dispensing ; Justrite Manufacturing Company Mar. 14, 2006.
Environmental Products, Spill Containment Caddy For Drum Handling and Dispensing, Gator Spill Containment Caddy; Justrie Manufacturing Company Mar. 14, 2006.
1 Photo—Specialty Sales, LLC system—Bakersfield, California Feb. 2, 2007.
2 Photos—Specialty Sales, LLC system—Tulare, California Apr. 2007.
2 Photos—Eakin Enterprises, Inc. system—Boardman, Oregon 2005.
15 Photos—Eakin Enterprises, Inc. system—Tulare, California Dates Unknown.
Controls for containment: work with containment/pumping specialist BakerCorp highlights growing capabilities of Controls Inc. (Industry News); Diesel Progress North American Edition; Diesel & Gas Turbine Publications, Inc. Nov. 1, 2008.
Don't allow lameness to grind down beef profits.; Farmers Weekly; Reed Business Information Limited Nov. 17, 2006.
Health: Role of footbaths in battle to control digital dermatitis; Dairy Farmer; CMP Information Ltd Nov. 16, 2005.
A double wall "day tank" system that provides primary and secondary containment in one integral space-saving unit is offered by Assmann Corp., Dairy Foods; Gale Group Inc Feb. 1, 2003.
FSI International Announces $11 Million Order For Chemical Management Systems; 06:48; PR Newswire Sep. 27, 1996.
Oxygenated feedwater treatment proves worth in a departure from traditional chemical-treatment practice, OT methodology features maintenance . . . ; Power Magazine; McGraw-Hill, Inc Oct. 1, 1994.
Compact multi-function pump controllers.(plant and equipment)(Pump Engineering Co.)(Brief article); Food Trade Review; Gale Group Inc Feb. 1, 2007.
Chapter 35—Chemical Feed Systems, Handbook of Industrial Water Treatment; GE Power & Water Jul. 25, 2008.
Submittal Manual: Day Tank—TRS Series; Tramont Corporation Jul. 2, 2007.
Engineered Feed Systems Carusmatic, Selection and Application Guide, (Series 2000), Rev 5.00; Carus Chemical Company Dec. 4, 2004.
Chemical Feed Systems, Bulletin FDP/CFS-04; Neptune Chemical Pump Co. Inc. Nov. 13, 2006.
Float Control Boxes, Price List; Kisco Sales, Inc. Nov. 15, 1996.
Pharmaceutical Process Validation: An International Third Edition, Revised and Expanded, Drugs And The Pharmaceutical Sceinces vol. 125 (RA Nash, AH Wachter, eds.) ; Marcel Dekker, Inc. Dec. 31, 2003.
Recommended Standards for Water Works, 2007 Edition, Policies for the Review and Approval of Plans and Specifications for Public Water Supplies, Great Lakes—Upper Mississippi River Board of State and Provincial Public Health and Environmental Managaers ; Health Research, Inc Sep. 22, 2008.
Chemical Safety Control Strategy for Critical Chemical Feed Systems, Section 6.1.3, Water, Wastewater, & Wetlands, Regulations & Standards; Massachusetts Department of Environmental Protection Dec. 1, 2009.
Code of Practice on Technical Aspects of Fluoridation of Water Supplies; Dec. 31, 2004.

(56) References Cited

OTHER PUBLICATIONS

Texas Flouridation Project, Operator Manual on Flouridation Procedures. Fluoridation Procedures; Texas Department of Health Feb. 28, 2007.
Stacked Discharge Drain Hose & Vent Hose Assemblies (347747 & 347748); SynderIndustries, Inc Aug. 19, 2002.

* cited by examiner

CATTLE FOOT-BATH SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF INVENTION

The present invention generally relates to a cattle foot-bath system, which is specifically adapted to mix and charge foot-bath troughs with precise quantities of chemical treatments.

BACKGROUND

Foot-baths are a valuable tool for the management of cattle, especially in larger scale dairy and feedlot operations. Their use can clean the feet or hooves of the cattle, killing bacteria, viruses and fungi, and generally helping in the heath and hardening of the hooves. When used to deliver the appropriate treatment, the use of foot-baths helps to reduce lameness associated with foot-rot, foot-and-mouth disease, heel erosion and digital dermatitis. For modern dairies, the foot-bath is typically included in the design of cattle housing, generally near the exit from a milking parlor, in a position through which cows normally move, or in an adjacent area through which cows can be diverted when necessary, with minimal disturbance to their normal routine. Ideally, two foot-baths should be used in tandem, the first containing water to clean the feet, and the second containing the suitable treatment chemical.

Conventional foot-bath systems are maintained and operated by on-site workers and personnel, who simply fill an empty foot-bath with a concentrate to a predetermined level, and then top off the foot-bath with water. This conventional technique sometimes results in foot-bath solutions that are too weak for effective treatment, or are too strong and may injure the feet of the cattle. A known improvement to this conventional, manual method includes the automated, metered control of the concentrate into the foot-bath. Such automatically metered systems have the potential to reduce the accurate delivery problems often encountered with the manual method. However, these automated system either require some sort of remote monitoring or feedback to a controller, or requires a user to program the controller to precisely follow the processing of cattle.

An economical and foolproof method for the operation of a cattle foot-bath is needed that provides the foot-bath with an accurately measured hoof treatment solution as needed for the particular cattle handling operation, without programming an expensive and difficult to maintain controller or some other automated, fallible feed-system apparatus. A detailed understanding of the present invention's features will be had upon reference to the following description, when read in conjunction with the accompanying drawings.

DESCRIPTION OF PREFERRED EMBODIMENTS

Figure 1:
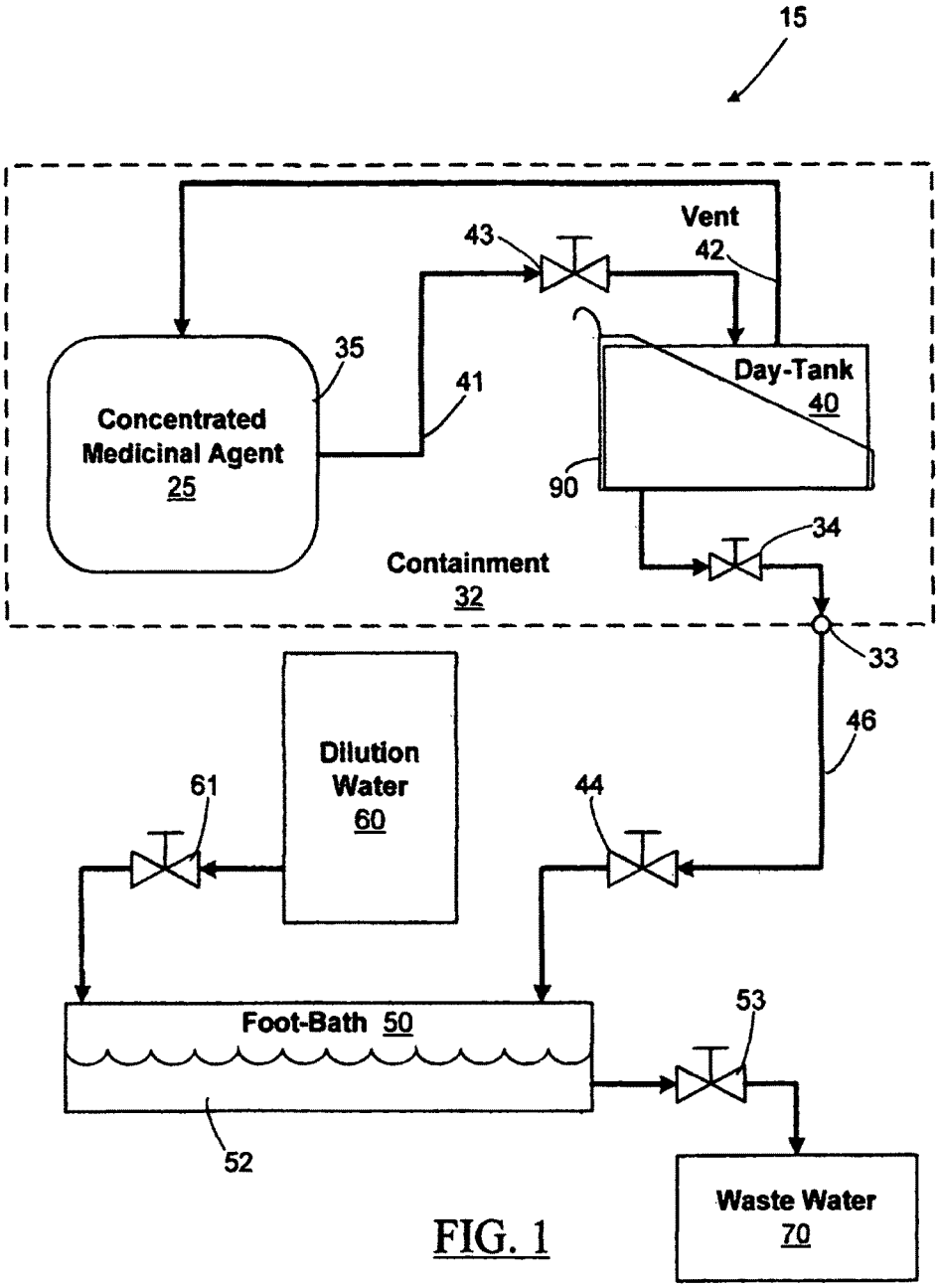
FIG. 1 is a schematic view of a cattle foot-bath system, according to a preferred embodiment of the present invention.

Preferred embodiments of the present invention are shown in FIGS. 1 through 3B, directed to a cattle foot-bath system 15. The cattle foot-bath system is well suited for the treatment and cleaning of feet or hooves of the cattle. As shown in FIG. 1, the cattle foot-bath system 15 includes the semi-automated delivery of a concentrated medicinal agent 25, the medicinal agent selected for the treatment of cattle feet.

The concentrated medicinal agent 25 may be any medically active bactericide, fungicide, or viruscide, desired for use in a foot bath 50 with the cattle foot-bath system 15 of the present invention. Preferably, the concentrated medicinal agent 25 is a concentrated "formalin" solution, which is formaldehyde in a water solution. Formalin is especially useful in the preventive treatment of lameness associated with foot rot, and related diseases caused by bacterial infections of the hooves. The formalin concentrate is most preferably contained in a portable tank, conventionally referred to as a "tote-tank" 35. Because the tote-tank contains a concentrated solution of what may be an environmentally sensitive substance, the tote-tank is preferably placed within a containment 32, as shown in FIGS. 1 through 3B. The containment prevents contamination of the environment external to the containment, if the tote-tank leaks.

The concentrated medicinal agent 25 is preferably fed through the containment 32 at a containment penetration 33, as shown in FIGS. 1 through 3B. Most preferably, the feed is also controlled with a feed shut-off valve 34, which acts as a safety valve to prevent leakage downstream of the containment.

As shown in FIGS. 1 through 3B, the concentrated medicinal agent 25 is fed into a day-tank 40. The day-tank holds the set quantity of the concentrated medicinal agent, providing an exact and consistent quantity for use with the foot-bath 50. The day-tank is sized to receive and precisely measure a quantity of the concentrated medicinal agent. Preferably, the day-tank contains five U.S. gallons, when filled, but could hold more or less material, depending on the activity and strength of the concentrated medicinal agent, the final volume of the foot-bath, and ultimate desired concentration of the resultant mixture within the foot-bath.

For the most preferred concentrated medicinal agent 25, a standard formalin concentrate, of 37% formaldehyde in water by volume is employed. After filling, the day-tank feed valve 43 is closed, and the day-tank 40 is ready for delivery to the foot-bath 50. The filled day-tank quantity of concentrate is mixed in the foot-bath 50 with a set quantity of a dilution water 60. Preferably, for the five-gallon day-tank, with the 37% solution, forty-five U.S. gallons of the dilution water are employed. This results in a volume of fifty U.S. gallons of a working mixture 52 within the foot-bath having a concentration of 3.7% formaldehyde in water by volume, or one-tenth of the original concentration. The dilution water may be any source of pure or recycled water for use by the cattle.

Figure 3A:
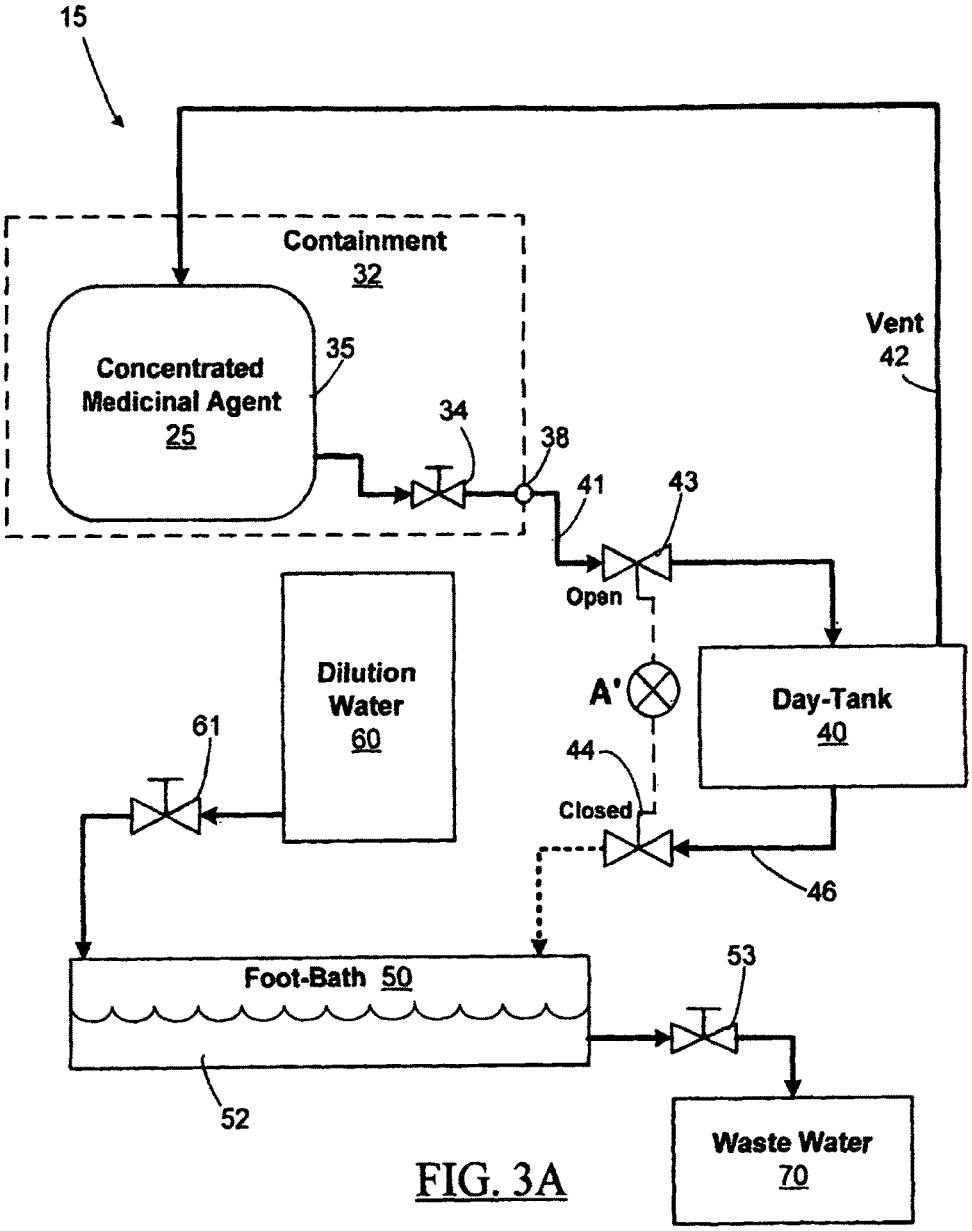
FIG. 3A is a schematic view of a cattle foot-bath system, according to a preferred embodiment of the present invention.
Figure 3B:
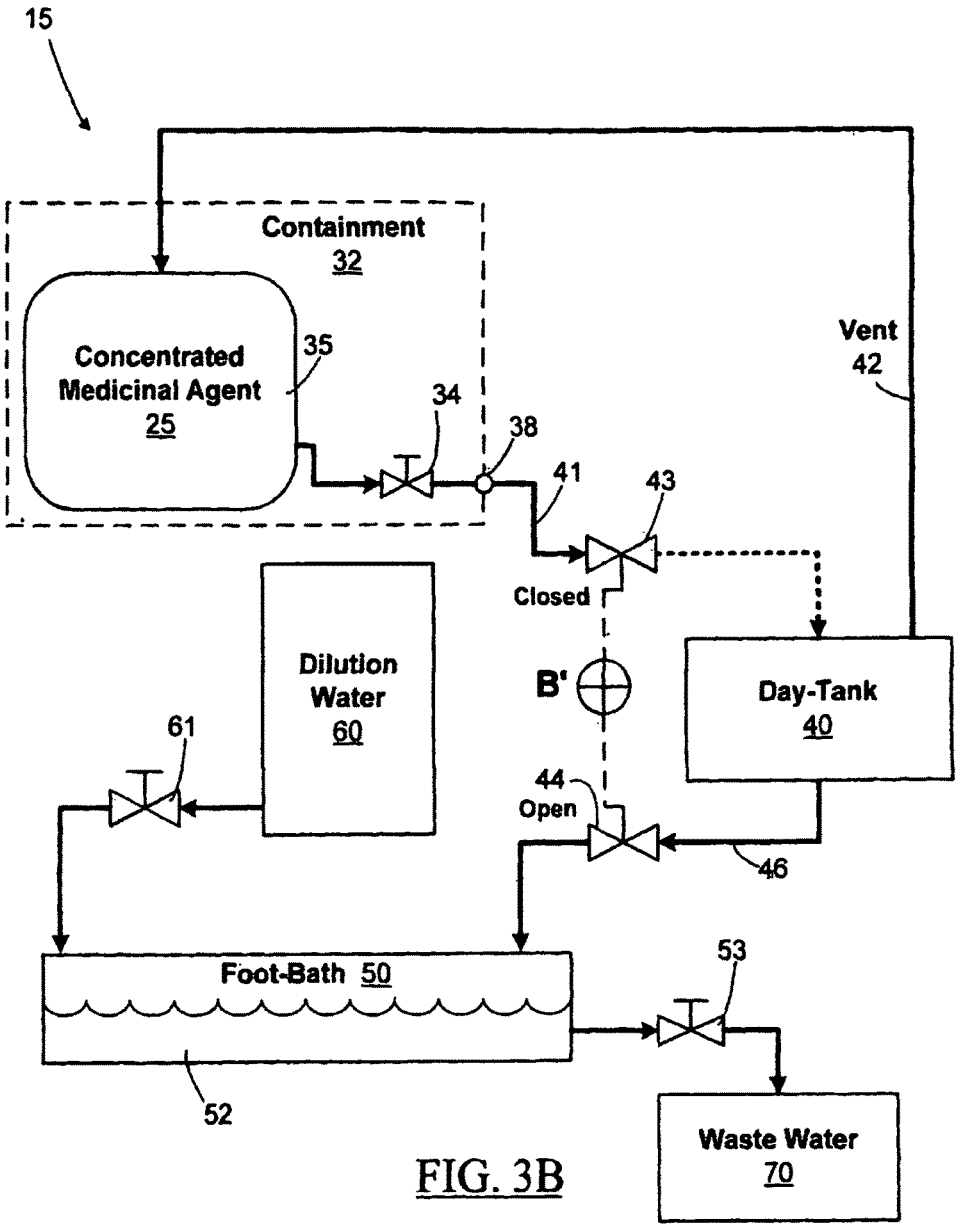
FIG. 3B is a schematic view of a cattle foot-bath system, according to a preferred embodiment of the present invention.

Specifically, as shown in FIGS. 1, 3A and 3B, a day-tank feed valve 43 is employed to control an infeed flow of the concentrated medicinal agent 25 into the day tank 40, through a concentrated feed-pipe 41. After the day-tank is filled, the day-tank feed valve is closed and a day-tank drain valve 44 is opened. The day-tank drain valve controls an outlet flow of the concentrated medicinal agent drained from the day-tank, through a day-tank drain pipe 46.

As shown in FIGS. 1 through 3B, the cattle foot-bath system 15 preferably includes a vent 42 connecting the day-tank 40 to the concentrated medicinal agent 25 this component recycles any vapors emitted from the day-tank, especially during filling, and if the day-tank is overfilled, the overflow is directed back to the tote-tank of concentrated medicinal agent.

Preferably, prior to the opening of the day-tank drain valve 44, to fill the foot-bath 50, the foot-bath is partially filled with the dilution water 60, by the opening of a dilution water valve 61. This may be additionally accomplished with either a metered valve, tank graduations on the container or tank holding the dilution water, or a mark on the foot-bath. Alternatively, the contents of the day-tank can be released into the foot-bath by opening the day-tank drain valve and the dilution water then added to "top-off" the foot-bath at a set fill point. With the pre-measured contents of the day-tank and the added dilution water, the foot-bath contains the working mixture 52, which includes the concentrated of the medicinal agent diluted to desired, effective level. This process for the cattle foot-bath system 15 is repeatable with the same exact results, without requiring exacting volumetric measurements or oversight by technically skilled personnel.

Preferably, the foot bath 50 is conventionally sized with capacity of fifty U.S. gallons. Typically, the foot-bath has a length of approximately six feet in and is approximately three feet in width. The working mixture 52 should fill the foot-bath to a depth of approximately four to six inches. The foot-bath can be located at the exit lanes from a milking parlor, when employed for use in a dairy operation.

Typically, the foot-bath 50 is drained and recharged with fresh working mixture 52 on a daily basis. To drain the previously mixed, used or spent working mixture 52 from the foot-bath, a foot-bath drain valve 53 is employed, as located in FIGS. 1 through 3B. The working mixture is transferred as a waste water 70, which may be any appropriate tank, lagoon or pond. The formalin active ingredient of the preferred concentrated medicinal agent 25 is converted into a benign by-product quickly, attributable to degradation from heat, sunlight and cattle urine. The waste water may be reclaimed for other uses in the farm, ranch or dairy employing the cattle foot-bath system 15.

Figure 2A:
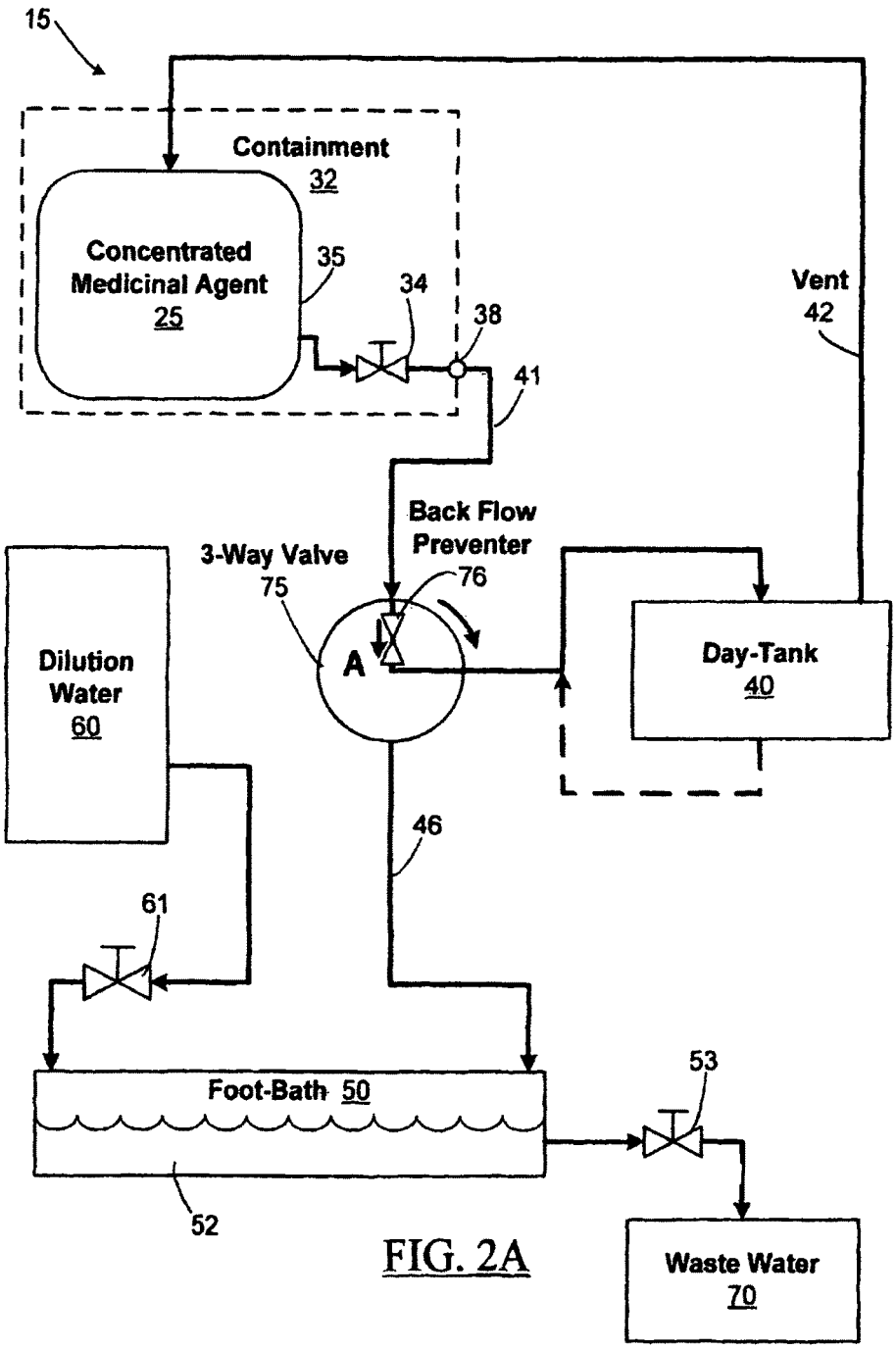
FIG. 2A is a schematic view of a cattle foot-bath system, according to a preferred embodiment of the present invention.
Figure 2B:
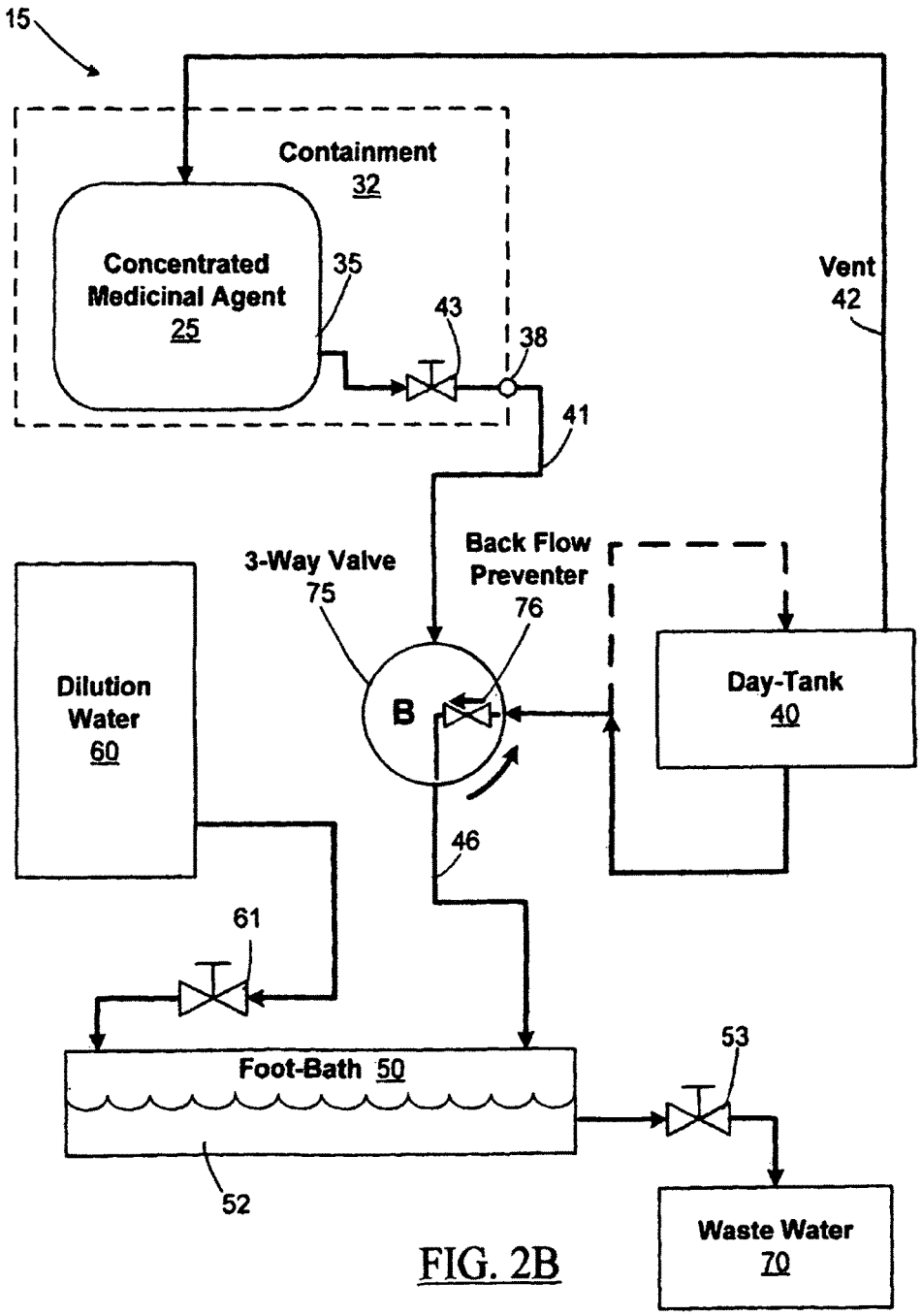
FIG. 2B is a schematic view of a cattle foot-bath system, according to a preferred embodiment of the present invention.

An alternative embodiment of the cattle foot-bath system 15 is shown in FIGS. 2A and 2B, employing a three-way valve 75. The three-way valve is preferably a conventional, three-way diverter type of valve, with an inlet and a valve with the ability to select one of two outlets. The three-way valve replaces the function of the day-tank feed valve 43 and the day-tank drain valve 44. The three-way valve also assures that the day-tank 40 is used as a measuring tank, and not drained as it fills, or simply employed as a flow-through passage from the tote-tank to the foot-bath 50. FIG. 2A shows the three-way valve in a day-tank fill position A, which serves to fill the day-tank, while preventing the day-tank from draining into the foot-bath. FIG. 2B shows the three-way valve in a day-tank drain position B, which serves to drain the day-tank, while preventing the day-tank from filling with the concentrated medicinal agent 25.

Additionally, the three-way valve 75 may include a back-flow preventer 76. The back-flow preventer is a standard flow control device that halts the reverse flow of liquid through the valve. In position A, as shown in FIG. 2A, the back-flow preventer stops the flow of concentrated medicinal agent 25, back to the tote-tank 35 from the day-tank 40. In position B, as shown in FIG. 2B, the back-flow preventer stops the flow of concentrated medicinal agent 25, back to the day-tank 40 from the foot-bath 50.

In an additional alternative embodiment of the cattle foot-bath system 15, a valve interlock 80 may be included, to further improve the reliability of operation for the cattle foot-bath system 15. As with the three-way valve 75, the valve interlock assures that the day-tank 40 is used as a measuring tank, and not drained as it fills, or simply employed as a flow-through passage to the foot-bath 50. FIG. 3A shows the valve interlock in a day-tank fill position A', which serves to open the day-tank feed valve 43, while closing the day-tank drain valve 44. FIG. 3B shows the valve interlock in a day-tank drain position B', which serves to drain the day-tank, while preventing the day-tank from filling with the concentrated medicinal agent 25.

The valve interlock 80 may be a mechanical or electrical device that prevents flow through the day-tank drain valve 44, while the day-tank feed valve 43 is in the open position, and conversely prevents flow through the day-tank feed valve, while the day-tank drain valve is in the open position. An interlock bar can be employed to serve as the valve interlock, or a solenoid powered electro-mechanical interlock can be utilized, for example.

For convenience in operation of the cattle foot-bath system 15, the day-tank 40 may be mounted directly to the tote tank of the concentrated medicinal agent 25, with a day-tank tray 90, as shown in FIG. 1. With the day tank tray attachment to the tote tank, the day tank can be placed within the containment 42, or straddle the containment as preferred. If the day-tank is placed within the containment, the containment penetration 33 is placed on the outflow from the day-tank, in the day-tank drain line to the foot bath 50.

Having now described the present invention, to those skilled in the art to which it pertains, it may become apparent that the need to make modifications without deviating from the intention of the invention. In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A cattle foot-bath system comprising:

a concentrated medicinal agent for the treatment of cattle feet;

a day-tank feed valve for controlling an infeed flow of the concentrated medicinal agent through a concentrated feed pipe, into a day-tank;

a day-tank drain valve for controlling an outlet flow of the concentrated medicinal agent drained from the day-tank;

the day-tank for holding a set quantity of the concentrated medicinal agent; a footbath for receiving a quantity of dilution water and the set quantity of the concentrated medicinal agent drained from the day-tank;

the quantity of dilution water and the set quantity of the concentrated medicinal agent from the day-tank mix in the footbath to form a repeatably precise concentration of a diluted medicinal agent*;* a day-tank tray mounted to a portable tank, the portable tank containing the concentrated medicinal agent; [and]

the day-tank received into the day-tank tray*; and*

*a vent connecting the day-tank to the portable tank containing the concentrated medicinal agent*.

2. The cattle foot-bath system of claim 1, wherein:

the concentrated feed pipe connects to a tank for containing the concentrated medicinal agent, and a containment surrounds the tank of concentrated medicinal agent; and the concentrated feed pipe passes through the containment proximate to a safety valve.

3. The cattle foot-bath system of claim 1, additionally including:

a valve interlock for preventing both the day-tank feed valve and the day-tank drain valve from both being open at the same time.

4. The cattle foot-bath system of claim 1, additionally including:

a three way valve for selectively routing flow of the concentrated medicinal agent into the day-tank from the concentrated feed pipe, or routing flow of the concentrated medicinal agent out of the day-tank through a day-tank drain pipe to the foot-bath.

5. The cattle foot-bath system of claim 1, wherein:

the concentrated medicinal agent consists of: a bactericide, a fungicide, or a viruscide.

6. The cattle foot-bath system of claim 1, wherein:

a containment surrounds the tank of concentrated medicinal agent and the day tank received into the day-tank tray;

a day-tank drain pipe connects to the day tank for draining the day-tank;

the day-tank drain pipe passes through the containment proximate to a safety valve; and the day-tank received into the day-tank tray; and the day-tank drain pipe passes through the containment proximate to a safety valve.

* * * * *